Nov. 11, 1952    J. S. POWERS ET AL    2,617,892
LIGHT TRANSMISSION MECHANISM

Filed Sept. 9, 1950    2 SHEETS—SHEET 1

INVENTORS.
John S. Powers and
Walter A. Lotz
BY Clarence E. Threedy
Their Attorney.

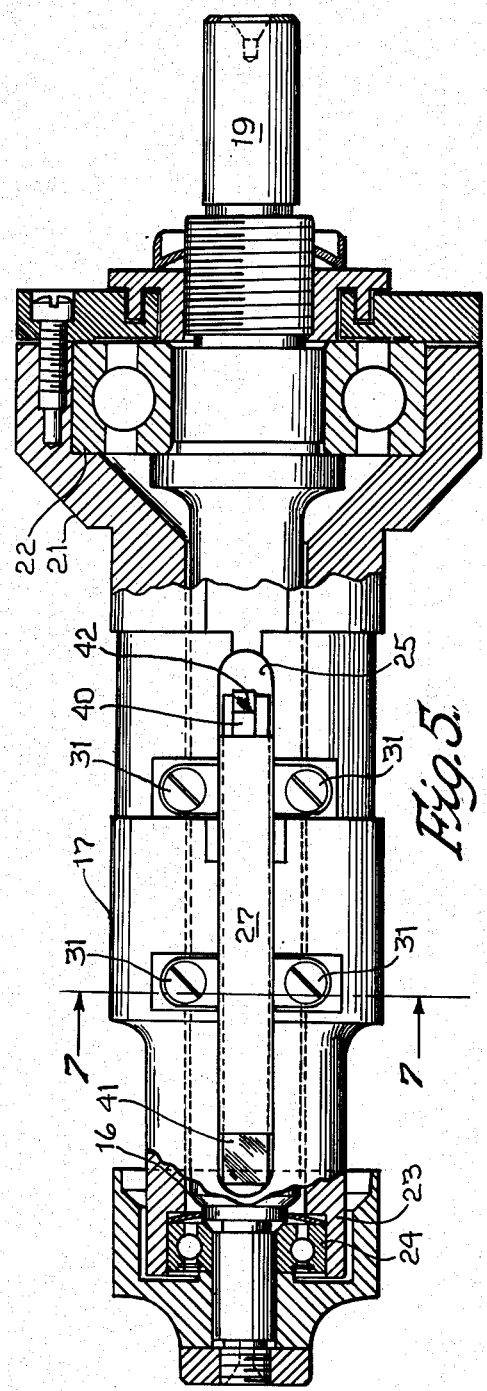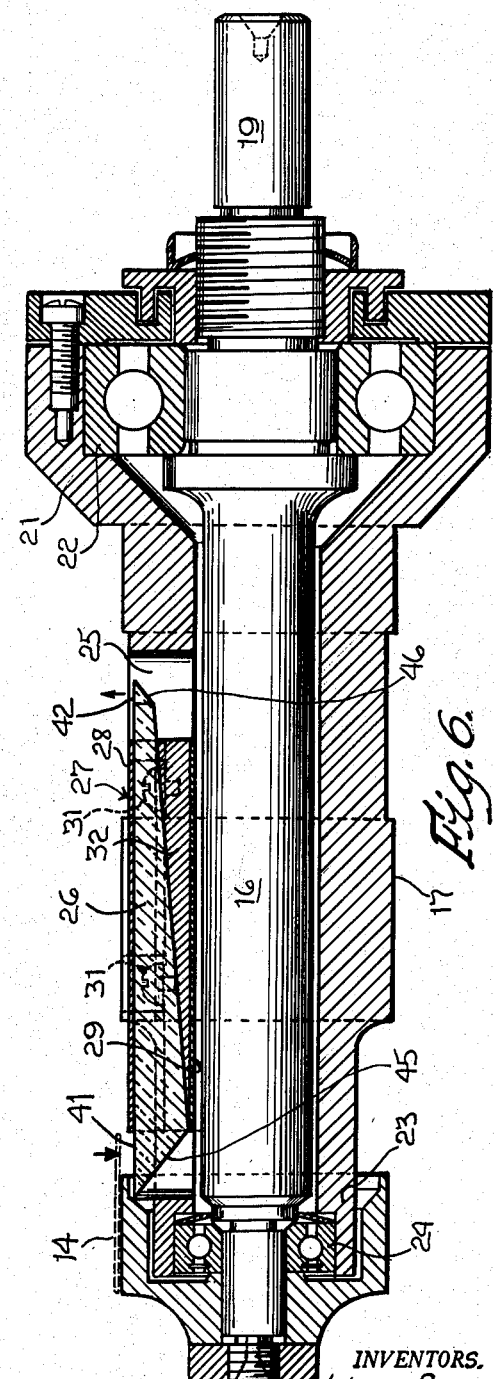

Patented Nov. 11, 1952

2,617,892

UNITED STATES PATENT OFFICE 2,617,892

LIGHT TRANSMISSION MECHANISM

John S. Powers, Palatine, and Walter A. Lotz, Chicago, Ill., assignors to De Vry Corporation, Chicago, Ill., a corporation of Illinois Application September 9, 1950, Serial No. 183,984

4 Claims. (Cl. 179—100.3)

This invention relates to certain new and useful improvements in light transmission mechanisms for an exciter light of a motion picture apparatus and has for its principal object the provision of an improved construction of this character which will be highly efficient in use and economical in manufacture.

One of the principal objects of this invention is to provide an arrangement for concentrating light from an exciter light on the photo-cell of a motion picture apparatus whereby to obtain the highest degree of perfection of sound reproduction.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 5 is an enlarged plan view of the same partly in section;

Fig. 6 is a longitudinal sectional detail view of the same;

Figure 1:
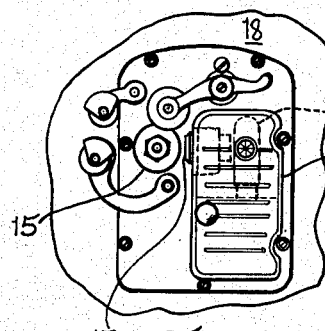
Fig. 1 is a fragmentary elevational view of a motion picture sound reproduction apparatus with which our invention is associated.
Figure 2:
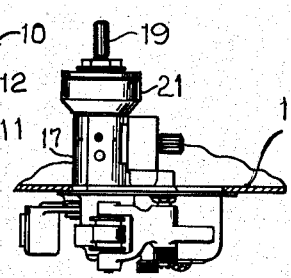
Fig. 2 is a top plan view of the same.
Figure 3:
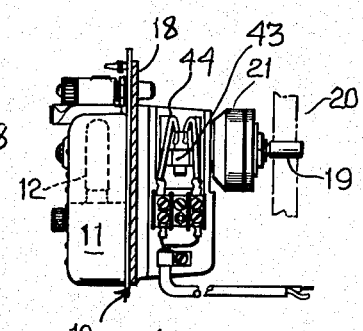
Fig. 3 is a side elevational view of the same.
Figure 4:
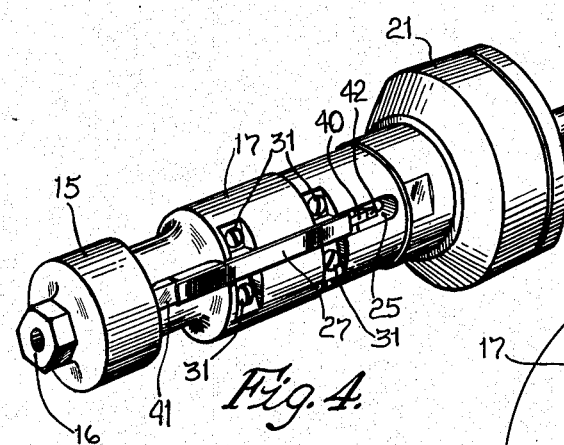
Fig. 4 is a perspective view of the light transmitter embodied in our invention.
Figure 7:
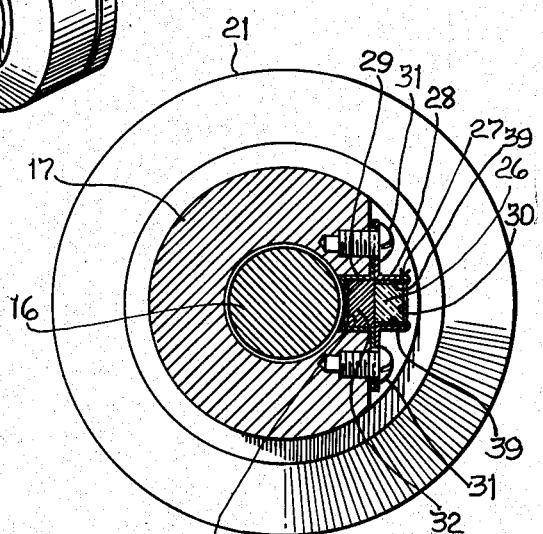
Fig. 7 is a sectional detail view taken substantially on line 7—7 of Fig. 5.
Figure 8:
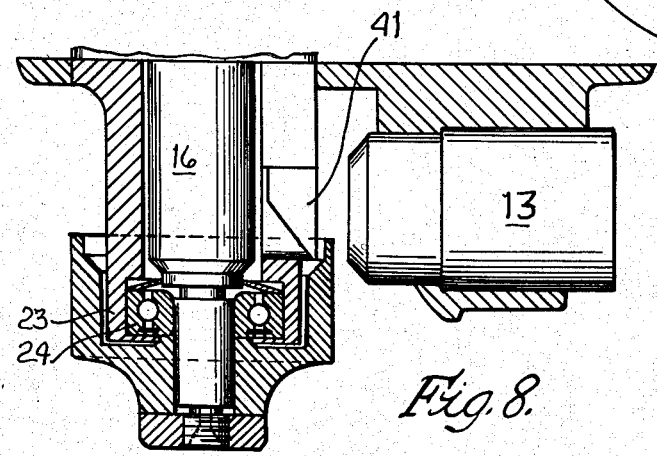
Fig. 8 is a fragmentary sectional detail view of the outer end of the transmitting mechanism showing the same in relationship to a scanning device.

In the drawing the motion picture sound reproduction apparatus is indicated at 10. On the front wall of such apparatus is mounted a lamp housing 11 including an exciter lamp 12 and a scanning device 13. This scanning device 13 confronts the sound track of the film web 14 as it passes over a sound drum 15. This sound drum 15 is rotatably mounted on a shaft 16 which passes through a bearing sleeve 17 mounted from the wall 18 of the apparatus 10. To the inner end portion 19 of this shaft is mounted a driven member 20 through the medium of which the shaft 16 is rotated.

The bearing sleeve 17 provides a bearing head 21 within which a suitable roller bearing 22 is arranged for the inner end portion of the shaft 16.

At the outer end portion 23 of the sleeve 17 is arranged a roller bearing 24 for the shaft 16.

The sleeve 17 provides an elongated slot 25. Positioned in this slot is a shaft 26 preferably formed of crown glass and tapering on three sides thereof in the direction of its long axis in a direction toward the photo-cell 43.

This light shaft with the exception of its opposite extremities is enclosed within an enclosure 27 preferably comprising two confronting plates 28 and 29 having arranged therein confronting channels 30. These plates are secured together and to the shaft 16 by means of screws 31. The shaft 26 is snugly mounted in this enclosure upon a filler strip 32 and between filler strips 39. The entire area of the shaft 26 with the exception of the extremities of the outer surface 40 is covered by preferably a black lacquer.

These uncovered areas are indicated at 41 and 42. By thus covering the surfaces of the shaft 26 except for the areas indicated at 41 and 42 no light traveling through the shaft can filter from or penetrate the shaft except the uncovered areas 41 and 42 of the surface 40.

It will be noted that the surface 41 is substantially larger than that of the uncovered surface 42. This surface 41 is disposed in alignment with the scanning device 13 and has concentrated thereon the light from the exciter light 12. The smaller area 42 confronts the photo-cell 43 which is mounted upon a structure 44 to the rear of the wall of the apparatus 10.

The shaft 26 at its end portions opposite the areas 41 and 42 provides right angular deflecting surfaces 45 and 46 respectively. These surfaces are covered with a covering similar to that covering the other surfaces of the shaft 26.

A light beam from the exciter light 12 will be concentrated by the scanning device 13 upon the area 41 and be deflected by the deflecting surface 45 in the long direction of the shaft 26 at the end of which long direction the light beam will be deflected by the deflecting surface 46 for concentration upon the photo-cell 43. By this arrangement the full light value from the exciter light is concentrated on the photo-cell resulting in the maximum perfection of sound reproduction.

While we have illustrated and described the preferred form of construction for carrying our invention into effect, this is capable of variation and modification without departing from the spirit of the invention. We, therefore, do not wish to be limited to the precise details of construction set forth, but desire to avail ourselves of such variations and modifications as come within the scope of the appended claims.

Having thus described our invention, what we claim as new and desire to protect by Letters Patent is:

1. A device for transmitting light from an exciter lamp of a motion picture sound reproducing apparatus to a photo-cell thereof comprising a bearing structure having an elongated slot formed therein, a shaft journaled in said structure, a sound drum on said shaft, an enclosure mounted on said shaft and positioned in said slot, a shaft of light transmitting material mounted in said enclosure with the extremities thereof projecting beyond the ends of the enclosure, said shaft with the exception of the outer surface of the said extremities being enclosed in a light impenetrable material, one of said extremities being adjacent said sound drum in confronting relation with respect to the exciter lamp and the other extremity of said shaft being in alignment with the photo-cell.

2. A device for transmitting light from an exciter lamp of a motion picture sound reproducing apparatus to a photo-cell thereof comprising a bearing structure having an elongated slot formed therein, a shaft journalled in said structure, an enclosure mounted on said shaft and positioned in said slot, a shaft of light transmitting material mounted in said enclosure with the extremities thereof projecting beyond the ends of the enclosure, said shaft with the exception of the outer surfaces of said extremities being enclosed in a light impenetrable material, one of said extremities being in confronting relation with respect to the exciter lamp and the other extremity of said shaft being in alignment with the photo-cell.

3. An optical system for transmitting light from an exciter lamp of a motion picture sound reproducing apparatus to a photo-cell thereof comprising a bearing structure having an elongated slot formed therein, a shaft of light transmitting material carried by said structure in said slot, a light-impenetrable covering of black lacquer for said shaft with the exception of the opposite extremities of one surface of the shaft, and mounting means for said shaft comprising a light-impenetrable enclosure and filler means of a length less than that of the shaft for mounting the shaft in said enclosure with its extremities extending beyond the opposite ends of said filler means.

4. An optical system for transmitting light from an exciter lamp of a motion picture sound reproducing apparatus to a photo-cell thereof comprising a bearing structure having an elongated slot formed therein, a light-transmitting shaft carried by said structure in said slot, a sound drum on said structure, a light-impenetrable covering for said shaft with the exception of the opposite extremities of one surface of the shaft, one of said extremities being adjacent said sound drum in confronting relation with respect to the exciter lamp and the other extremity of said shaft being in alignment with the photo-cell, and mounting means for said shaft comprising a light-impenetrable enclosure and filler means of a length less than that of the shaft for mounting the shaft in said enclosure with its extremities extending beyond the opposite ends of the filler means.

JOHN S. POWERS.
WALTER A. LOTZ.

REFERENCES CITED

The following references are of record in the file of this patent:

UNITED STATES PATENTS

| Number | Name | Date |
| --- | --- | --- |
| 2,350,786 | Marette | June 6, 1944 |
| 2,350,789 | Marette | June 6, 1944 |
| 2,496,959 | Rodgers | Feb. 7, 1950 |